INVENTOR
FLOYD M. MINKS
BY
Andrus & Starke
Attorneys

INVENTOR
FLOYD M. MINKS
BY
Andrus & Starke
Attorneys

INVENTOR
FLOYD M MINKS
BY
Andrus & Starke
Attorneys

United States Patent Office
3,421,069
Patented Jan. 7, 1969

3,421,069

REGULATED POWER SUPPLY INCLUDING A BLOCKING OSCILLATOR AND TRIGGER MEANS TO TURN OFF THE OSCILLATOR

Floyd M. Minks, Campbellsport, Wis., assignor, by mesne assignments, to Brunswick Corporation, Chicago, Ill., a corporation of Delaware Filed Aug. 4, 1966, Ser. No. 570,244
U.S. Cl. 321—2 25 Claims
Int. Cl. H02m 3/22

ABSTRACT OF THE DISCLOSURE

The present disclosure relates to a blocking oscillator including a feedback winding connected to the base-emitter elements of a blocking oscillator transistor. A silicon controlled rectifier is connected across the input of the feedback winding. A current and/or voltage output sensor is connected to the gate of the controlled rectifier.

This invention relates to a regulated power supply system and particularly to a blocking oscillator employing a special feedback control system to regulate the output power.

Regulated power supplies are employed to provide an output having a predetermined constant current or constant voltage characteristic. In all such power supplies, the degree of regulation and the efficiency of the power supply constitute important considerations in the design and construction of the power supply system. Further, the problem of damage to the components in response to open circuit or short circuit conditions must be considered.

The present invention is particularly directed to a regulated power supply which can provide high efficiency over a wide range of input and/or output voltages. The supply provides a constant voltage or constant current output control or a combination thereof such as a constant current with a maximum voltage control.

Generally, in accordance with the present invention, the supply employs a blocking oscillator having an input means for turning on the oscillator in response to completion of the power supply connection and a feedback loop to provide the desired oscillator action. In accordance with the present invention, a triggered switch means such as a silicon controlled rectifier or other rapidly acting solid state device is connected in the feedback loop circuit and adapted to shunt the input of the oscillator amplifying section and thereby terminate the cycle. This invention provides a very reliable and inexpensive control means for terminating the cycle of a blocking oscillator and therefore provides a means for regulating the input power to the oscillator and the output of a power supply of which it forms a part.

The silicon controlled rectifier or other switching device can be made sensitive to the current and/or voltage output by the use of suitable current sensors and voltage sensors applied to a triggering circuit for controlling of the controlled rectifier.

Generally, in accordance with a more specific aspect of the present invention, the blocking oscillator includes an amplifying stage connected in circuit with the charging winding of the oscillator transformer. A main feedback loop includes a feedback winding of the oscillator transformer or inductor connected in circuit with the input of the amplifying stage and suitable resistors and capacitors. A silicon controlled rectifier or the like is connected in a shunt path across the feedback loop and particularly the feedback winding. The shunt path also establishes a turn-off power path through the amplifying section.

The silicon controlled rectifier is normally nonconducting and consequently the feedback loop operates in a normal manner. During this portion, a capacitor in the feedback loop is charged. When the rectifier is fired, it shunts the feedback power from the input circuit and further completes the turn-off power path to apply the charged capacitor to the input circuit to rapidly turn-off the amplifying section.

The precise point at which the silicon controlled rectifier is fired is controlled in the present invention by a controlled initial charging of a control capacitor plus a signal that increases with the time the amplifier has been on or conducting. The feedback control capacitor is prebiased in accordance with the sensed output; for example, in accordance with the current output to provide a current regulation.

In an extremely satisfactory current regulated and voltage limited circuit, the output circuit of the oscillator transformer includes a pair of windings connected in series with each other and with a pair of diodes to charge a capacitor when the inductor charging cycle terminates. The end of the one winding is grounded and connected to the opposite polarity end of the opposite transformer by a paralleled shunt resistor and capacitor. The current signal is taken across the shunt resistor by a diode and a resistor connected in series. This signal was applied to a feedback level detector and amplifier which controls the charging of the capacitor. A fixed preset voltage may also be employed to bias the amplifier to compensate for the voltage drops in the circuit such that the circuit rapidly responds directly to the current changes.

Additionally, Zener diodes are connected across the opposite winding. Until the voltage reaches the maximum selected level as determined by the Zener diode, the voltage signal does not affect the control circuit. However, when the Zener diode conducts, a signal is provided to the detector and amplifier to increase the prebias on the capacitor and cause shut-off during the very beginning portion of the charging cycle.

In an alternative construction, essentially the same charging and feedback loop circuit were employed. The current signal however was compared against a D.C. voltage reference and the difference applied to a control oscillator. The output of the oscillator in turn was connected back to provide the prebias on the capacitor and thereby control the firing point of the silicon controlled rectifier through the control of the bias on a transistor. The voltage control circuit in this embodiment of the invention employed a suitable Zener control connected into a comparator stage to modify the input to the control oscillator and thereby provide a summation control of the charge on the capacitor through control of the control oscillator.

The drawings furnished herewith illustrate preferred constructions of the present invention in which the above advantages and features are clearly disclosed as well as others which will be clear from the following description of the drawings.

Figure 1:
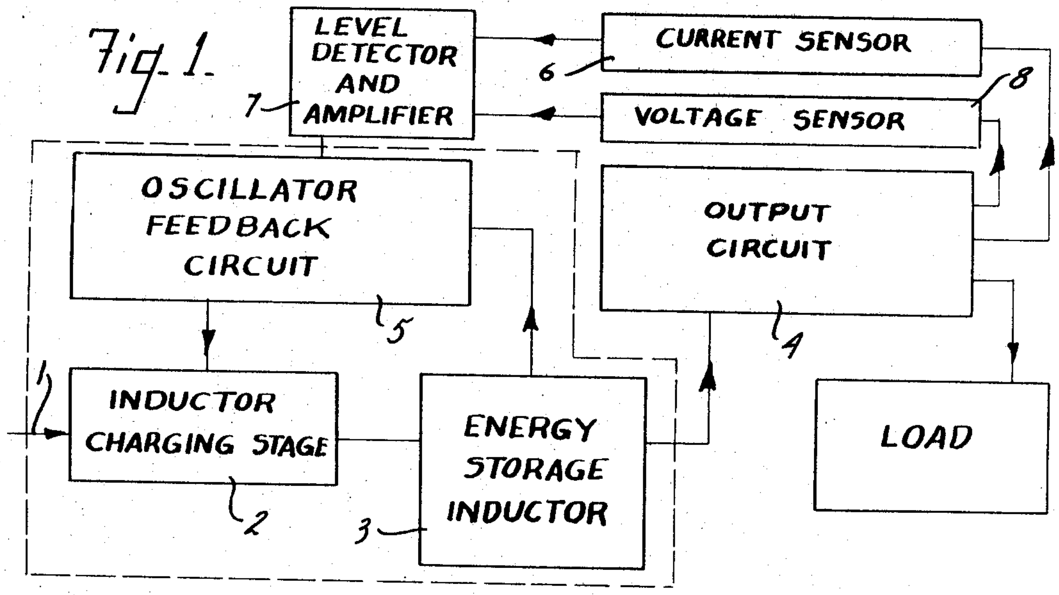
FIG. 1 is a block diagram of a regulated power supply constructed in accordance with the present invention.

Referring to the drawings and particularly to FIG. 1, a regulated power supply is shown including a D.C. power source line 1 connected to a charging circuit or switching stage 2 of a blocking oscillator. The switching stage 2 is connected in circuit with an oscillator transformer or inductor 3. During the charging cycle, energy is stored in the inductor 3. At the termination of the charging cycle, the energy is transferred to an output circuit 4. During the charging cycle, energy is also fed through a feedback circuit 5 to maintain the charging cycle for a selected period. In accordance with the illustrated embodiment of the present invention shown in FIGS. 1 and 2, a current sensor 6 is connected to the output 4 and establishes a current responsive or proportional signal connected to control a level detector and amplifier 7. The output of the amplifier 7 is connected to control the feedback loop or circuit 5 in a manner to terminate a charging cycle of the inductor 3 and thereby control the output to the circuit 4. A voltage sensor 8 is also connected to detect the output voltage and to further control the level detector and amplifier 7 to provide an overriding maximum voltage limit control.

Figure 2:
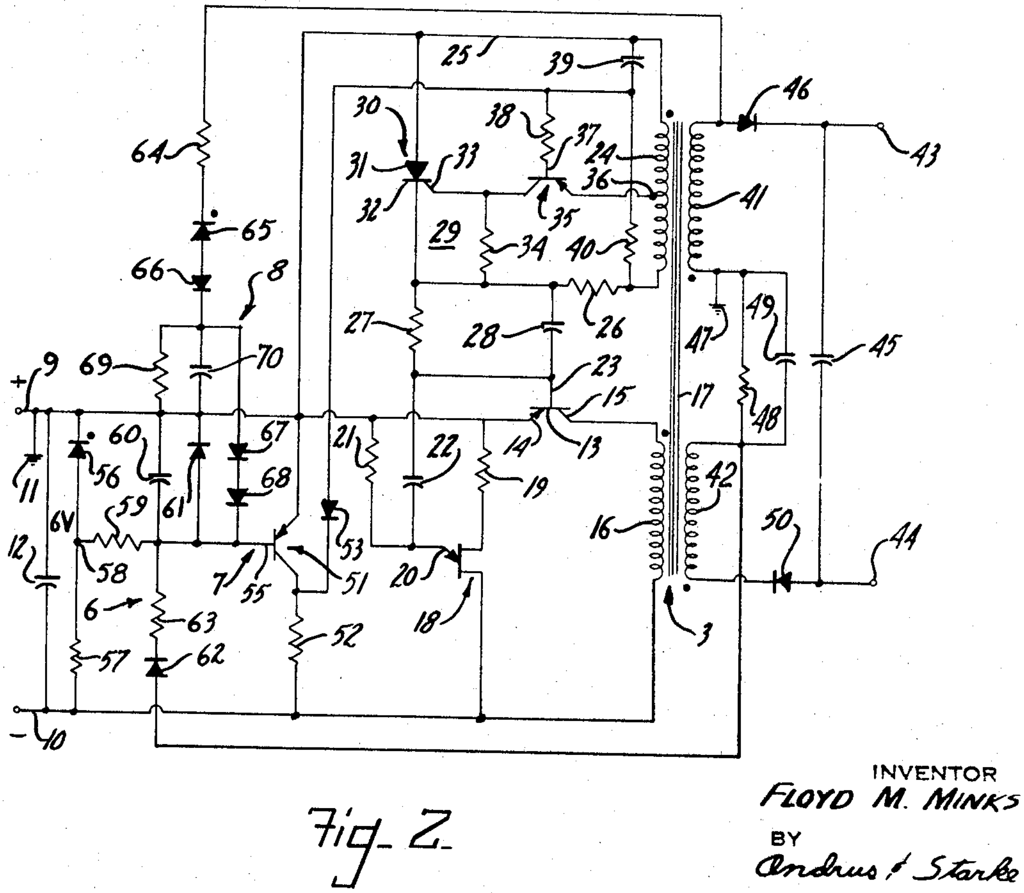
FIG. 2 is a schematic circuit diagram of a preferred construction of the power supply shown in block diagram in FIG. 1.

Referring particularly to FIG. 2, a preferred schematic circuit diagram is shown of the elements shown in block diagram in FIG. 1 for more fully disclosing and describing the present invention. The power source shown in FIG. 2 includes a pair of D.C. power lines 9 and 10 labeled respectively as positive and negative lines. The positive power line 9 is grounded as at 11 to provide a common ground connection to the circuit. A large capacitor 12 is connected directly across the incoming side of the power lines 9 and 10 to effectively ground the negative line for all A.C. signals.

The charging control or switching stage 2 in the illustrated embodiment of the invention includes a transistor 13 of a PNP variety. The emitter 14 of the transistor is connected to the positive line 9 and the collector 15 is connected in series with a primary winding 16 of the energy storage inductor 3 to the negative line 10. Current through the winding 16 during the charging cycle stores energy in a core 17 of the inductor 3.

The initial charging cycle is positively initiated in the illustrated embodiment of the invention by a trigger circuit including a unijunction transistor 18 connected in a known relaxation oscillator circuit. The base-to-base circuit of transistor 18 is connected directly across the lines 9 and 10 with a current limiting resistor 19 connected between the line 9 and the transistor 18. Emitter 20 of transistor 18 is connected in series with a resistor 21 to the positive line 9. A capacitor 22 is connected between the emitter 20 and the base 23 of the transistor 13 and thus inserts the base to emitter junction of transistor 13 as the load in the circuit of the unijunction transistor 18. The capacitor 12 in essence provides a direct connection between the positive and negative leads as far as A.C. transient signals are concerned. Consequently, the capacitor 22 forms a voltage source connected directly across the emitter-base circuit of the transistor 13 and discharges therethrough to provide a positive turn-on of the transistor 13.

Once a charging cycle is initiated, the current through the transformer winding 16 establishes a magnetic field and stores energy in the core 17. A part of the energy is fed back by a feedback winding 24 to the base-emitter circuit of the transistor 13 to maintain or drive it into conduction.

In the illustrated embodiment of the invention, the side of the transformer winding 24 having a positive polarity during the charging cycle, as shown by the polarity dot symbol, is connected by a lead 25 directly back to the positive line 9 and therefore to the emitter 14 of the charging transistor 13. A resistor 26 in series with a paralleled resistor 27 and a capacitor 28 is connected between the opposite side of the winding 24 and the base 23 to complete the feedback loop. Under normal circuit operation, the feedback would initially drive the transistor 13 into saturation and the charging cycle would continue until the circuit through transistor 13 rises until it begins to enter the saturation region or the transformer 3 is saturated. The field would then collapse and establish reverse polarity condition to turn off the transistor 13 and transfer the stored energy to the output circuit 4.

In accordance with an important aspect of the present invention, however, the turn-off of the blocking oscillator is controlled by a special turn-off control circuit 29 having a triggered on-off type switching means shown as a silicon controlled rectifier 30 providing phase control during the charging cycle. The silicon controlled rectifier 30 has its anode 31 tied to the lead 25 and therefore to the one side of the winding 24. The cathode 32 is connected to the junction of the resistors 26 and 27 and thus provides a shunt path across the emitter to base junction of the transistor 13 with respect to the feedback winding 24.

The silicon controlled rectifier 30 in accordance with well known theory of operation normally presents an open circuit condition in both directions and includes a gate 33 for firing the silicon controlled rectifier into conduction. A gate resistor 34 is connected between the gate to cathode circuit of the rectifier 30. Once conducting, rectifier 30 continues to conduct until such time as the current drops below the holding value.

A transistor 35 connects the gate 33 to a tap 36 on the feedback winding 24. The base 37 of the transistor 35 is connected in series with a resistor 38 to a control bias branch circuit for varying the conductivity of the transistor 35 and therefore the exact firing point of the silicon controlled rectifier 30, as presently described.

The control bias branch includes a capacitor 39 in series with a resistor 40. The capacitor 39 is connected to one side of the winding 24 and the resistor 40 is connected to the opposite side of the winding 24.

During the charging cycle, the capacitor 39 is charged by the output of the feedback winding 24 and therefore in accordance with the time the transistor 13 is on. The voltage at the junction of the capacitor 39 and the resistor 40 is applied to the base 37 of the transistor 35 and consequently controls its conductivity. This in turn controls the firing point of the silicon controlled rectifier 30. The tapped transformer winding 24 and the resistors 26 and 27 and capacitor 28 define a pair of voltage dividing systems with the gate to cathode circuit of the rectifier 30 connected therebetween. The voltage between the center tap 36 and the junction of resistors 26 and 27 is therefore applied across the gate to cathode circuit and in series with the transistor 35. The voltage across the voltage dividing network however is also directly dependent upon and varies during the charging cycle as a result of the capacitor 39. Further, the signal applied to the gate to cathode circuit is equal to the difference in the signals at the tap 36 and the junction of the resistors less the drop across the transistor 35. This in turn is controlled directly by the charge on the capacitor 39.

In accordance with the illustrated embodiment of the invention, the capacitor 39 is biased to a selected voltage level in accordance with the output signal of circuit 4 from which level the charge increases in accordance with the on-time of the inductor charging cycle. As a result, the particular point in the charging cycle that the silicon controlled rectifier 30 is turned on is related to such output signal and is shifted to increase and decrease the charging time by the prebiasing signal.

In the illustrated embodiment of the invention, the oscillator transformer is provided with a pair of output windings 41 and 42 connected in circuit with the output as a part of the output circuit 4. The windings 41 and 42 are connected in series with each other through the output circuit to output terminals 43 and 44 and across an output capacitor 45.

More particularly the winding 41 is connected in series with a diode 46 to the positive terminal 43 and to the corresponding side of the capacitor 45. The opposite side of the transformer 41 is connected to ground as at 47. A resistor 48 in parallel with a capacitor 49 is connected between the ground 47 and the transformer winding 42.

A diode 50 connects the opposite side of the winding to the negative terminal 44 and the corresponding side of the capacitor 45.

During the charging of the inductor, the diodes 46 and 50 prevent current flow in the output windings 41 or 42 and the energy is stored in the core 17. When the charging cycle terminates the polarity of the windings 41 and 42 reverses and the diodes 46 and 50 are biased to conduct and thereby charge the capacitor 45 in accordance with the energy in the core 17.

In accordance with the present invention, the current sensor 6 is connected across the resistor 48 to provide a load voltage dependent or proportional to current and the voltage sensing circuit sensor 8 is connected across the winding 41 to provide a peak voltage detection level and both are connected to the level detector and amplifier 7.

In FIG. 2, the level detector and amplifier 7 includes a transistor 51 of the PNP variety having the emitter to collector circuit connected across the D.C. lines 9 and 10 with the collector connected in series with a collector-resistor 52 to the negative line 10. The transistor 51 and the resistor 52 form a voltage dividing network across the power lines. The capacitor 39 is connected across the output circuit of the transistor 51 to be selectively charged in accordance with the conductivity of the transistor. Thus, one side of the capacitor is connected through the line 25 to the line 9 and therefore to the emitter of the transistor 51. A diode 53 connects the collector side of the transistor 51 to the opposie side of the capacitor 39. As looked at from another standpoint, the capacitor 39 is therefore connected across the D.C. power lines in series with the diode 53 and the resistor 52. The transistor 51 is connected across the circuit of the capacitor 39 and the diode 53 to provide a variable conductivity bypass circuit thereby controlling the charge on the capacitor 39 and the charge or voltage applied to the base 37 of the transistor 35 via the resistor 38. This in turn will control the precise firing point of the silicon controlled rectifier 30 as previously described. The conductivity of the transistor 51 is in turn controlled by the current and voltage sensors 6 and 8, as follows.

The base 55 of the transistor 51 is connected to a small fixed input bias current source including a Zener diode 56 connected in series with a resistor 57 across the lines 9 and 10. The junction 50 of the diode 56 and resistor 57 is thus held at a constant negative voltage with respect to ground and coupled to the base 55 through the coupling resistor 59. In operation, the input bias loop is from the positive line 9, the emitter-base of transistor 51, resistor 59 and Zener diode 56. The negative bias current thus produced is many times that required to keep transistor 51 in the saturation region in the absence of signals from the current or voltage sensors 6 and 8.

The sensors 6 and 8 are connected to control and adjust the bias of transistor 51 and thereby regulate the output current and voltage as presently described.

A capacitor 60 which determines the frequency response of the feedback loop is connected between the base 55 and the line 9 and a protective diode 61 is connected in parallel therewith.

The current sensor 6 in the illustrated embodiment of the invention includes a temperature stabilizing diode 62 in series with a feedback resistor 63. The series connected diode 62 and resistor 63 are connected between the base 55 and the ungrounded side of the shunt resistor 48 and the paralleled capacitor 49 and thus to the corresponding end of the winding 42. Capacitor 49 reduces the RMS current through resistor 48 without altering the average value. Thus it reduces dissipation in resistor 48.

The current sensor 6 provides a current signal to the junction connection of resistor 59 and the base 55 of the transistor 51. This supplies the current in the circuit of resistor 59. Since the voltage established by diode 56 is constant, the bias current through the transistor 51 is reduced. When the current from sensor 6 is at about the level of the bias current through resistor 59, any slight change in the signal current results in an amplified change in the circuit of transistor 51, thus producing level detection and amplification as previously noted. This in turn varies the corresponding voltage of the capacitor 39 and particularly the prebiased level.

The capacitor 60 is relatively large and the time constant of capacitor 60 and resistor 63 is sufficiently long to average the current feedback over an appreciable number of cycles of the oscillator circuit to maintain stable operation. Typically, the time constant of capacitor 60 with the components connected thereto may average fifty times the period of the oscillator circuit.

The variation in the conductivity of the transistor 51 controls the precharging of the capacitor 39 which is connected in series with diode 53 in parallel with the emitter-collector of transistor 51.

Thus, as the sensed current signal reduces the conductivity of transistor 51, the voltage applied to the capacitor increases correspondingly and thereby increases the prebias level of the capacitor 39.

The time at which the capacitor 39 is then charged by the output of the feedback winding 24 to a level causing a proper input bias to the transistor 35 to permit firing of the silicon controlled rectifier 30 is correspondingly decreased. The firing of rectifier 30 causes turn-off of transistor 13 and therefore termination of the energy storage portion of the oscillator cycle.

The prebias on the capacitor 39 thus provides a load sensitive control signal which varies the precise time at which the trigger signal is applied to the silicon controlled rectifier 30 to thereby vary the shunting of the feedback signal during the charging cycle and the resulting precise turn-off.

Since during each cycle the bias on the capacitor also increases with time, transistor 13 has been on in that cycle. This system is a true continuous phase type control.

As previously noted, the voltage sensor 8 provides a maximum voltage signal limitation on the circuit. In the illustrated embodiment of the invention, the voltage sensor 8 includes a resistor 64 connected to the one side of the transformer winding 41 in series with a Zener diode 65, a blocking diode 66 and a pair of isolating diodes 67 and 68, such as a known stabistor, between winding 41 and the base 55 of the transistor 51. The blocking diode 66 will prevent conduction through the circuit when the voltage across the winding 41 is reversed during the charging cycle. During the opposite half cycle, the Zener diode 65 provides a blocking action as long as the voltage is below a selected level. If the voltage rises above that level, however, the Zener diode 65 conducts and provides a large signal to the junction of resistor 59 and base 55, such that the current in the emitter-base of transistor 51 decreases rapidly and drives the transistor to cutoff, thereby increasing the prebias on the capacitor 39 and causing firing of the silicon controlled rectifier 30 during the initial portion of the charging cycle. This in turn is reflected in a substantially reduced output signal to reduce the voltage output.

A resistor 69 and capacitor 70 are connected in parallel between the connection of the diode 66 to the diodes 67 and 68 and the positive lead 9. The resistor-capacitor circuit provides a filtering for all high frequency transients in the output circuit and the resistor 69 further provides a path for the leakage currents of Zener diode 65.

In summary, the embodiment of the invention illustrated in FIG. 2 operates as follows.

The unijunction transistor 18 is fired as a result of the discharging of the capacitor 22 through the base emitter circuit of the transistor 13. Once the charging cycle is established the feedback signal through the winding 24 drives the transistor 13 into the saturation region to provide maximum or full conduction. During the charging portion of the cycle, the silicon controlled rectifier 30 is in a normally nonconducting state. However, during the very first cycle, the capacitor 39 is charged only from the feedback winding 24 and a relatively long time is taken to charge capacitor 39 to the necessary level to properly bias the transistor 35 to fire rectifier 30. The oscillator operates at maximum output until the desired output is reached as indicated by a current signal supplied by the current sensor or a voltage signal is supplied by the voltage sensor. Normally, the voltage will be sufficiently low such that only the current sensor is effective.

In FIG. 2, the current signal is applied to the base 55 and resistor 59 via the diode 62 and the resistor 63. This controls the conductivity of transistor 51 and provides an initial charge on the capacitor 39 from which the charging cycle begins to further charge capacitor 39. As the initial charge is increased, the selected firing voltage for triggering of the silicon controlled rectifier 30 will be reached at an earlier point in the charging cycle and establish a shunt or bypass across the base to emitter circuit with respect to the feedback winding 24 and terminates the charging cycle. When rectifier 30 conducts, it provides a shunt or bypass circuit for the current from the winding 24 through rectifier 30 and resistor 26. Simultaneously, the capacitor 28 establishes a turnoff current or voltage across the base-emitter circuit of transistor 15 and the rectifier 30 to positively and rapidly turn off the transistor 13.

The polarity of the windings 41 and 42 reverses in accordance with known theory and the energy is transferred into the capacitor 45.

In this continuing manner, variation in the current output above and below a desired level varies the bias on the transistor 51 to vary the prebias of the capacitor 39. This is reflected in a continuous shifting of the angle of firing of the silicon controlled rectifier 30 during the charging cycle to provide a smooth continuous control and thereby maintaining a constant current output signal from the power supply.

If the output voltage rises above the approximately true level established by the voltage of Zener diode 65, a large signal is applied to the base 55 of the transistor 51 causing the capacitor 39 to charge to a high level and providing an input bias on the transistor 35 and therethrough to the gate to cathode circuit of the silicon controlled rectifier 30 to cause it to fire during the very initial portion of the charging cycle and thereby minimizing power transfer to the output circuit. The illustrated circuit provides an extremely efficient power regulator.

The regulated power supply can of course be employed in a practical system where efficient regulation over a wide range of input and output voltages is desired. The system may be advantageously applied for example as a capacitor discharge solid state ignition system for internal-combustion engines, as shown in FIG. 3.

Figure 3:
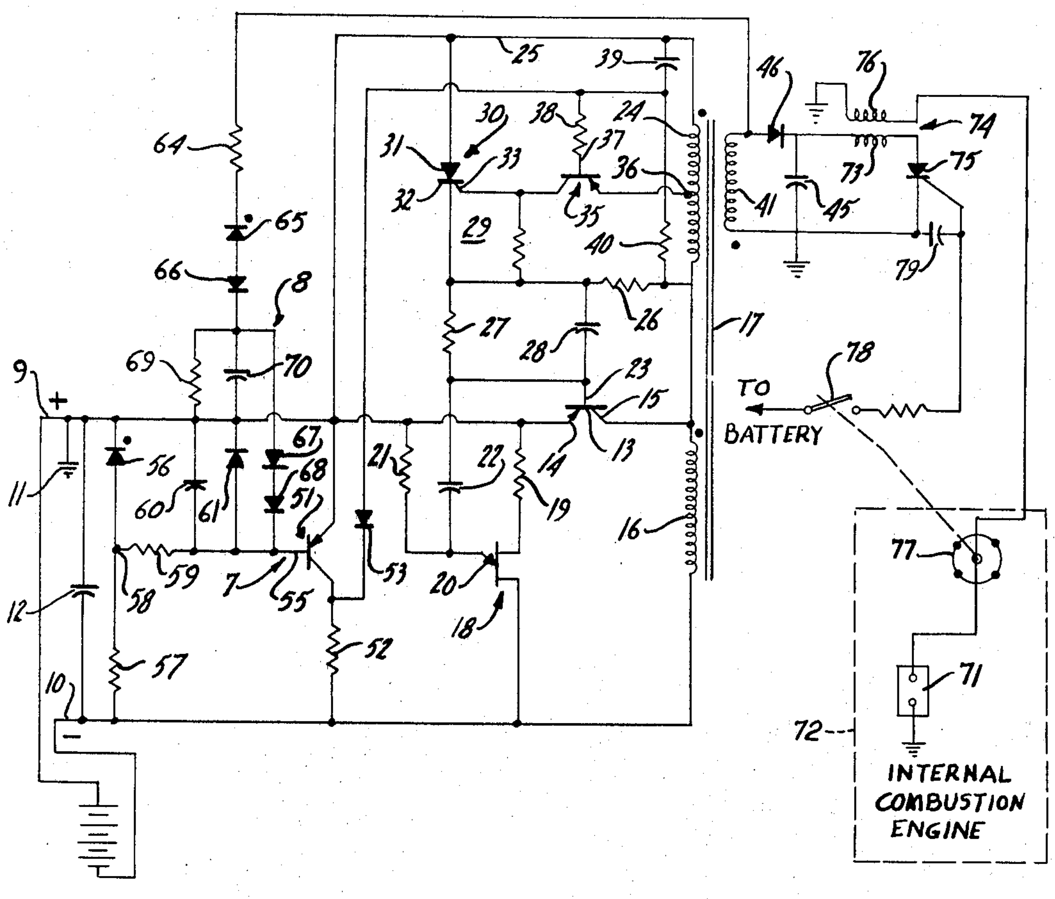
FIG. 3 is a schematic circuit diagram of an ignition system constructed in accordance with this invention.

The second embodiment employs a charging and feedback loop generally similar to that shown in FIG. 2 and consequently corresponding elements in the embodiments of FIGS. 1 and 2 will be similarly numbered in FIG. 3 for simplicity and clarity of explanation.

Referring particularly to FIG. 3, the system shown is generally similar to that shown in FIG. 2 except that the current sensor circuit is removed and only the voltage sensitive circuit is provided to control the charging of the capacitor 45. Consequently, the capacitor 45 will be charged to a selected voltage level by the continuous recycling of the oscillator circuit.

In the illustrated embodiment of the invention, the output circuit and particularly capacitor 45 is connected to selectively fire the spark plugs 71 of an internal-combustion engine 72, as follows. The capacitor is connected in a discharge circuit including the primary winding 73 of a pulse transformer 74 in series with a silicon controlled rectifier 75. The secondary winding of the transformer 74 is connected in series with the spark plugs 71 through a distributor 77 for sequentially applying the firing pulses to the spark plugs in the proper sequence. The firing or discharging of the capacitor is controlled by a set of contacts or points 78 coupled to be driven in timed relation to the distributor 77. The points are connected between the positive side of the battery and the gate of the silicon controlled rectifier 75 to provide proper timed pulsing of the silicon controlled rectifier and discharge of the capacitor.

In the operation of the circuit, the starting of the blocking oscillator will be assured by the relaxation unijunction oscillator. The Zener diode 65 will be selected to maintain the prebias circuit and in essence disconnected or effectively removed until such time as the capacitor 45 reaches the selected regulated voltage. Thus, the oscillator will establish a series of cycles to charge the capacitor until it reaches the desired level at which time the Zener diode 65 will conduct and apply a cutoff signal to the base 55 of the transistor 51. This in turn will charge the capacitor 39 such that during the succeeding charging cycles as the capacitor will rapidly reach the cutoff point to fire the silicon controlled rectifier 30, establish the shunt bypass circuit with respect to the feedback winding 24 and immediately terminate the charging cycle. When the points close, current flows into the gate to fire the silicon controlled rectifier 75 and discharge the fully charged capacitor 45. The operation of the oscillator circuit is so much more rapid than the operation of the points so that the capacitor 45 will be fully charged between each closure or during the period that the points 78 are open. This provides a very reliable means for providing a regulated output for an ignition system and therefore providing an output essentially independent of engine speed and battery voltage with the resulting highly desirable characteristics as more fully explained in applicant's copending application entitled Regulated Capacitor Discharge Ignition System, Ser. No. 435,832, filed on Mar. 1, 1965, and is assigned to the same assignee as the present application.

In the embodiment of FIG. 3, the output circuit employs a single output winding 41 providing a grounded system for use in ignition systems.

Figure 4:
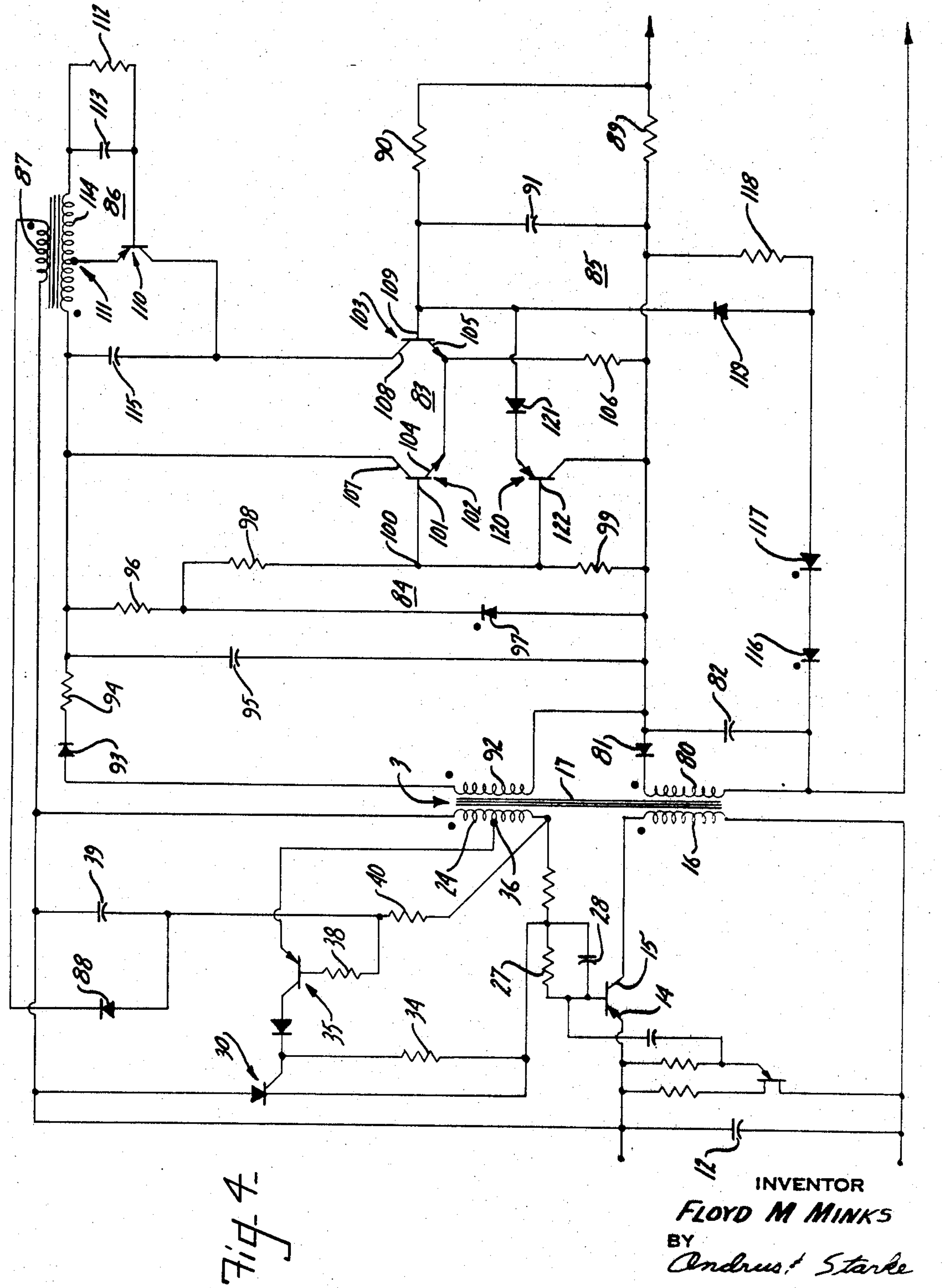
FIG. 4 is a schematic circuit diagram of an alternative embodiment of the invention showing a regulated power supply forming a part of a solid state ignition system for an internal combustion engine such as an outboard motor.

A further embodiment of the present invention employing generally a similar oscillator circuit similar to that shown in FIGS. 2 and 3 but employing a different and novel current and voltage sensing means is shown in FIG. 4.

For purposes of simplicity and clarity of explanation the corresponding elements of FIGS. 2 and 4 are similarly numbered and only the current and voltage sensing circuits and their particular connection into the feedback loop will be particularly described in detail for purposes of clarity and simplicity of explanation.

Referring particularly to FIG. 4, the charging circuit 2 and the feedback circuit 5 are generally the same as that shown in FIG. 2. The oscillator inductor 3 similarly includes the primary winding 16 and a corresponding feedback winding 24. A single output winding 80 is connected in series with a diode 81 to charge an output capacitor 82 similar to the circuit shown in FIG. 3. The level detector and amplifier 7 in FIG. 4 includes a comparator stage 83 which compares a preset D.C. (direct current) signal from a fixed D.C. voltage circuit 84 with a feedback signal derived from a combined current and voltage sensing circuit 85. The output of the comparator circuit controls a free running oscillator 86 which has an output winding 87 connected through a diode 88 to control the bias on the capacitor 39 of the oscillator feedback circuit. Thus, the free running oscillator 86 is controlled in accordance with the output signals, as hereinafter more fully developed, and thereby controls a bias or initial charge of the capacitor 39.

A current sensing resistor 89 is connected in series in the one output lead; shown connected to the negative side of the capacitor 82. A filtering resistor 90 and capacitor 91 are series connected across the resistor 89 such that the potential at the junction of the resistor 90 and capacitor 91 is proportional to the average load current through the resistor 89 and is applied to the comparator 83 to control the charging of capacitor 39 as hereinafter described.

The D.C. supply 84 includes a winding 92 wound on the core 17 of the inductor with the noted polarity. A diode 93 in series with a resistor 94 and a capacitor 95 provides a direct current supply to the comparator 83 and across a resistor 96 and a Zener diode 97. A pair of series connected resistors 98 and 99 are connected across the Zener diode 97 to provide a preselected bias voltage of the common junction 100 which is connected to the base 101 of a transistor 102 forming a part of the comparator circuit 83.

The comparator 83 includes a pair of NPN transistors 102 and 103 having the emitters 104 and 105 interconnected to each other and to the negative side of the D.C. supply 84 through a common resistor 106 and the collectors 107 and 108 connected to the positive side of the D.C. supply, with the collector 108 of transistor 103 connected in series with oscillator 86.

The transistor 102 and resistor 106 constitute an emitter follower such that the emitter 105 of transistor 103 is held at a constant potential which is slightly less than the potential of the junction 100.

As a result, the collector current of transistor 103 increases rapidly from cutoff or nonconduction in response to a small increase in voltage at the base 109 above the potential at the base 101 of transistor 102. The base 109 is connected to the junction of the resistor 90 and capacitor 91 and is thus biased by a voltage proportional to the average load current.

The collector 103 is connected in circuit to supply power to the blocking oscillator 86 and thereby establish a load or output related isolated signal to the control network including capacitor 39.

To provide temperature stabilization, the Zener diode 97 is operated at a voltage having small variation with temperature. Further, the changes in characteristics with temperature of the transistors 102 and 103 tend to cancel.

The blocking oscillator 86 is a known free running variety including a switching transistor 110 and inductor 111. The input circuit of the transistor 110 includes paralleled resistor 112 and capacitor 113 in series with a portion of a tapped inductor winding 114 of inductor 111. The feedback circuit includes the other portion of the inductor tapped winding 114 in series with the transistors 110 and the comparator transistor 103. An input filtering capacitor 115 is connected across the transistor 110 and the second portion of inductor winding 114.

In operation, a turn-on potential at the base 109 of transistor 103 increases the charge on capacitor 39 to decrease the on-time and therefore the output of the main oscillator charging circuit. As the load current decreases, the potential at the base 109 of the transistor 103 drops resulting in a decreased output of the control blocking oscillator 86 and a decreased charging of capacitor 39. The output of the main oscillator correspondingly increases.

The illustrated circuit also includes a further control responsive to the output or load voltage, as follows.

An input signal proportional to the output voltage is derived from a pair of Zener diodes 116 and 117 series connected with each other and with a resistor 118 across the capacitor 82. A blocking diode 119 connects the junction of resistor 118 and the series connected Zener diodes 116 and 117 to the base 109 of transistor 103. The Zener diodes 116 and 117 block current in the voltage sensitive circuit until a desired open circuit voltage is established. At that time capacitor 82 provides a voltage signal through the diode 119 to the base 109. The transistor 103 conducts heavily and increases the output of the control oscillator 86 to rapidly charge the capacitor 39 to a level to turn off the main oscillator during the very initial portion of the charging cycle. This maintains the output voltage at the selected maximum open circuit voltage.

Additionally, a protective surge transistor 120 is connected to protect the circuit against high voltage current spikes which might bias the circuit to a level preventing turn-off. The emitter-collector circuit of a PNP transistor 120 is connected in series with a diode 121 between the base 109 and the negative side of the power supply 84. The base 122 of the transistor 120 is connected to the fixed voltage at junction 100 such that the input is the difference of the two input voltages of the comparator 83. The circuit is normally held off as the voltage difference at bases 101 and 109 is normally less than the voltage drop across the diode 121 and the base-emitter junction of the transistor 120. However, if a large spike voltage is applied to the base 109, the transistor 120 conducts to bypass the current from the base 109 and thereby protect the circuit from high damaging current spikes.

In summary, the embodiment of the invention illustrated in FIG. 4 operates as follows. The relaxation oscillator formed with transistor 18 positively turns on the charging transistor of the main oscillator to initiate a charging cycle and thereby stores energy in the core 17 and establishes a feedback signal in the winding 24 as in FIG. 2. The capacitor 39 is charged in accordance with the on-time of the charging cycle to produce an increasing control signal to the transistor 35 which in turn controls the firing of the silicon controlled rectifier 30.

The winding 92 of the inductor 3 establishes a D.C. supply to the control oscillator 86 and to the comparator stage 83. During the initial portion of the circuit operation, the output of the voltage and current sensing circuit 85 are such that the control oscillator 86 is essentially off and the main oscillator operates at maximum output. As the current output increases, a proportional signal is applied to the base 109 of the comparator transistor 103. A small increase above the fixed level of the potential at junction 100 and therefore base 101 of transistor 102 drives the transistor 103 into conduction and the output of control oscillator 86 increases. Its output is supplied to charge the capacitor 39 in accordance with the output current level to reduce the on-time of the main oscillator and thereby reduce the output.

If the voltage rises above a preselected maximum level, the Zener diodes 116 and 117 conduct and provide a heavy current signal to the base 109 causing the collector current to increase driving the oscillator 86 into a maximum output condition. This rapidly charges the capacitor 39 and establishes a rapid turn-off of the oscillator charging cycle.

If for any reason, a highly abnormal signal spike is fed to the base 109 if transistor 103, the diode 121 and transistor 122 conduct to shunt the heavy current spike; thereby preventing damage to the comparator stage 83.

The embodiment shown in FIG. 4 therefore provides essentially the same basic functioning and operation as the previously described embodiments with a corresponding high efficiency and excellent regulation.

A circuit similar to that shown in FIG. 4 was constructed and operated and had the resulting characteristics.

The present invention thus provides a relatively simple and highly reliable means of controlling and producing a regulated blocking oscillator by activating of a rapid or on-off type switching device shunted across the feedback loop of the oscillator circuit. The device provides a regulator which can be current and/or voltage regulated in a manner providing good regulation with high efficiency.

Various modes of carrying out the invention are contemplated as being within the scope of the following claims particularly pointing out and distinctly claiming the subject matter which is regarded as the invention.

1. A regulated power supply comprising a blocking oscillator including an electronic amplifying device having an input circuit connected in a feedback loop including a feedback winding, a triggered switch means shunted across the feedback winding to terminate a charging cycle of the oscillator, and firing means connected to and responsive to a selected characteristic of the output of the oscillator to fire the triggered switch means.

2. A regulated power supply comprising a blocking oscillator including a switching transistor having a base loop including a feedback winding in series with a voltage dividing network, and an electronic switch means connected across the feedback winding and a portion of the voltage dividing network to terminate a charging cycle of the oscillator, and firing means connected to and responsive to a selected characteristic of the output of the oscillator to fire the triggered switch means.

3. The regulated supply of claim 2 having the firing means connected to the switch means and including operating means actuated partially as a function of the time since the transistor has been turned on and partially by an output related signal.

4. The regulated supply of claim 2 wherein the voltage dividing network includes a pair of impedances connected between the electronic switch means and the feedback winding and the switch means is connected between the impedances and the opposite end of the feedback winding, said firing means including a capacitive means in series with an impedance means connected across the feedback winding and thereby charged during the time said oscillator is on, and charging circuit means connected to the capacitive means to charge the capacitive means in accordance with an output power characteristic.

5. The regulated supply of claim 4 wherein said feedback winding is tapped and a variable impedance is interconnected between the switch means and a tap on the winding and said variable impedance includes a control means connected to respond to the charge on the capacitive means.

6. The regulated supply of claim 4 wherein said feedback winding is tapped and including a control transistor having output elements connected between the tap and the electronic switch means and said control transistor having an input element connected to the capacitive means to control the conductivity of the control transistor in accordance with the charge on the capacitive means.

7. The regulated supply of claim 4 wherein the charging circuit means includes a charging control transistor means connected to divert a charging current from said capacitive means, and means responsive to the output power connected to control the charging control transistor means.

8. The regulated supply of claim 7 wherein said charging control transistor includes a constant current input circuit, and a current responsive input means connected to the input circuit and adapted to supply current thereto in accordance with the output current of said oscillator to thereby vary the conductivity of the control transistor and the charging of the capacitive means.

9. The regulated supply of claim 7 wherein said charging control transistor includes a voltage responsive input means to supply current thereto in accordance with the output of said oscillator to thereby vary the conductivity of the charging control transistor and the charging of the capacitive means.

10. The regulated supply of claim 7 wherein said charging control transistor has an input circuit including a current responsive input means and a voltage responsive input means to supply current thereto in accordance with the output of the oscillator to vary the conductivity of the charging control transistor and the charging of the capacitive means.

11. A regulated power supply, comprising a blocking oscillator having a feedback loop including a triggered switch means connected to terminate a charging cycle of the oscillator, firing means responsive to a selected characteristic of the output of the oscillator to fire the triggered switch means, and said firing means includes a capacitor and circuit means for sensing the output of the supply to control the charging of the capacitor, said circuit means including a power diverting amplifying means connected between the capacitor and a power source, a constant current source connected to bias the amplifying means on, and load sensing means connected to the output and to the constant current source to selectively supply current thereto and thereby vary the conductivity of the amplifying means.

12. The regulated supply of claim 11 wherein the load sensing means includes a current sensor and a voltage sensor, one of said sensors having a long time constant and the other having a short time constant.

13. The regulated supply of claim 11 wherein the load sensing means includes a current sensor connected to sense the current flow and provide an output which is the average of a substantial number of cycles of the oscillator and a voltage sensor connected to respond to essentially a single cycle of the oscillator.

14. A regulated power supply, comprising a blocking oscillator having a feedback loop including a triggered switch means connected to terminate a charging cycle of the oscillator, firing means responsive to a selected characteristic of the output of the oscillator to fire the triggered switch means, the firing means includes a capacitor and circuit means connecting the output of the supply to charge the capacitor, said circuit means including a control oscillator having its output connected to the capacitor, and sensing means to actuate said oscillator in accordance with the output of the supply.

15. A regulated power supply, comprising a blocking oscillator having a feedback loop including a triggered switch means connected to terminate a charging cycle of the oscillator, firing means responsive to a selected characteristic of the output of the oscillator to fire the triggered switch means, the firing means includes a comparator, said comparator including a pair of comparator transistors having the emitters connected to each other and through a resistor to a common circuit point, a reference signal means with respect to said common point connected to the input means of the one comparator transistor to form an emitter follower, the opposite comparator transistor being connected in the circuit of the switch means and said opposite transistor having an input means controlled by the output of the regulated supply.

16. The regulated supply of claim 15 wherein said opposite transistor is connected in the circuit of a control oscillator having an output connected to control operation of the switch means.

17. The regulated supply of claim 15 including a protective transistor connected to provide a low impedance path between the common circuit point and the input means of said opposite transistor and having an input means connected to the input means of said comparator transistor to control the protective transistor.

18. A regulated power supply comprising, a blocking oscillator constructed as a free running oscillator having an amplifying switch having output elements connected in series circuit with an energy storage inductor and having input elements, said inductor including a feedback winding connected in a main feedback loop with the input elements of the switch, said feedback loop including energy storage means, a triggered switch means connected to the feedback winding and defining a shunt path for the winding bypassing said input elements and said energy storage means and defining a turnoff power path including the input elements and the energy storage means and firing means responsive to a selected characteristic of the output of the oscillator to fire the triggered switch means.

19. A regulated power supply, comprising a blocking oscillator including a transistor having an input element, an output element and a common input-output element, said common element and said input element being connected in a feedback loop including a feedback winding and a pair of resistors connected in series with each other, said resistors being connected between said input element and said winding, a solid state electronic device defining a triggered switch means and connected to the junction of said resistors and the opposite end of the feedback winding and having an input trigger means, and a capacitor connected in parallel with the resistor connected to the input element, a firing means responsive to a selected characteristic of the output of the oscillator and being connected to the input trigger means to fire the triggered switch means.

20. The regulated supply of claim 19 having a resistor in series with a capacitor connected across the feedback winding, and an impedance connecting the trigger means to the connection of the resistor and capacitor.

21. The regulated supply of claim 19 having a resistor in series with a capacitor connected across the feedback winding, an impedance connecting the trigger means to the connection of the resistor and capacitor, a sensing means connected to sense the output of the supply and providing an electrical signal in accordance therewith, and means connecting said sensing means to the capacitor to charge the capacitor in accordance with the electrical signal.

22. The regulated supply of claim 19 having a resistor in series with a capacitor connected across the feedback winding, and means interconnecting the trigger means to the feedback winding and having a control connected to the connection of the resistor and the capacitor and requiring a selected minimum input to establish a conductive path.

23. The regulated supply of claim 19 having a resistor in series with a capacitor connected across the feedback winding, and a control transistor having output means connected in series between the trigger means and the top of the feedback winding and having an input means connected to the junction of the capacitor and resistor.

24. In a comparator circuit, including a pair of solid state amplifying devices, the first of which includes a reference input means and the second of which includes a signal input means, with the output derived therefrom being controlled by the relative signal inputs, the improvement in a surge protective switching device having input elements connected to the reference input means and the signal input means of the first and second amplifying devices respectively and responsive to a signal above a selected level to divert the power of the input signal from the signal input means and to thereby reduce the drive on the second amplifying device.

25. The comparator circuit of claim 24 wherein said amplifying devices are transistors having emitters connected to each other and in series with a common emitter resistor, the fixed reference input means to the one transistor providing an emitter follower action whereby the second transistor is sensitive to a voltage at the signal input means above the voltage at the reference input means, and said surge protective switching device is a transistor having the base connected to the reference input means and the emitter connected to the signal input means.

References Cited

UNITED STATES PATENTS

| | | | |
|---|---|---|---|
| 3,005,147 | 10/1961 | Thomas. | |
| 3,159,799 | 12/1964 | Cooper | 331—113.1 X |
| 3,263,124 | 7/1966 | Stuermer. | |
| 3,310,723 | 3/1967 | Schmidt et al. | 331—113.1 X |
| 3,316,445 | 4/1967 | Ahrons | 321—2 |
| 3,331,033 | 7/1967 | Johnston | 321—2 X |
| 3,345,570 | 10/1967 | Matyckas. | |

OTHER REFERENCES

Electronics, "Low-Cost Transistor Overload Safety Circuit," p. 102, Oct. 14, 1960.

JOHN F. COUCH, *Primary Examiner.*

W. H. BEHA, Jr., *Assistant Examiner.*

U.S. Cl. X.R.

315—209; 317—31; 321—18, 19; 323—22; 330—11; 331—112; 123—148